United States Patent [19]

Churchill

[11] Patent Number: 5,572,818
[45] Date of Patent: Nov. 12, 1996

[54] FIBER OPTIC LIGHT BAR FOR EDGE LIGHTED SIGNAGE

[76] Inventor: David L. Churchill, P.O. Box 215, Ellenton, Fla. 34222

[21] Appl. No.: 407,624

[22] Filed: Mar. 21, 1995

[51] Int. Cl.⁶ .................................................. G09F 13/00
[52] U.S. Cl. .............................. 40/547; 362/26; 362/32
[58] Field of Search ........................ 40/546, 547; 362/31, 362/32, 321, 812, 26

[56] References Cited

U.S. PATENT DOCUMENTS

| | | | |
|---|---|---|---|
| 4,279,089 | 7/1981 | Murakami | 40/547 |
| 4,555,694 | 11/1985 | Yanagishima et al. | 40/546 X |
| 4,974,354 | 12/1990 | Hembrook, Jr. | 40/546 |
| 5,027,258 | 6/1991 | Schoniger et al. | 40/547 X |
| 5,075,826 | 12/1991 | Lan | 40/546 X |
| 5,165,187 | 11/1992 | Shahidi-Hamedani et al. | 40/547 |
| 5,260,686 | 11/1993 | Kuo | 362/32 X |

*Primary Examiner*—Brian K. Green
*Attorney, Agent, or Firm*—Charles J. Prescott

[57] ABSTRACT

A fiber optic display sign for preselected sequential lighting of one or more of a plurality of transparent side-by-side panels each having viewable indicia thereon. Selective illumination of each of the panels is by a single light source which transmits light through a selective light transmitting device into fiber optic bundles which terminate at their opposite ends at, and are secured in, one or more openings defining a plurality of rows in an elongated light bar. The panels, when secured to the light bar having one edge of each panel in optical alignment with one of the rows of optical fiber bundle ends, may be sequentially illuminated to create distinctive visual effects as in advertising, multi-colored logo display or the like.

1 Claim, 2 Drawing Sheets

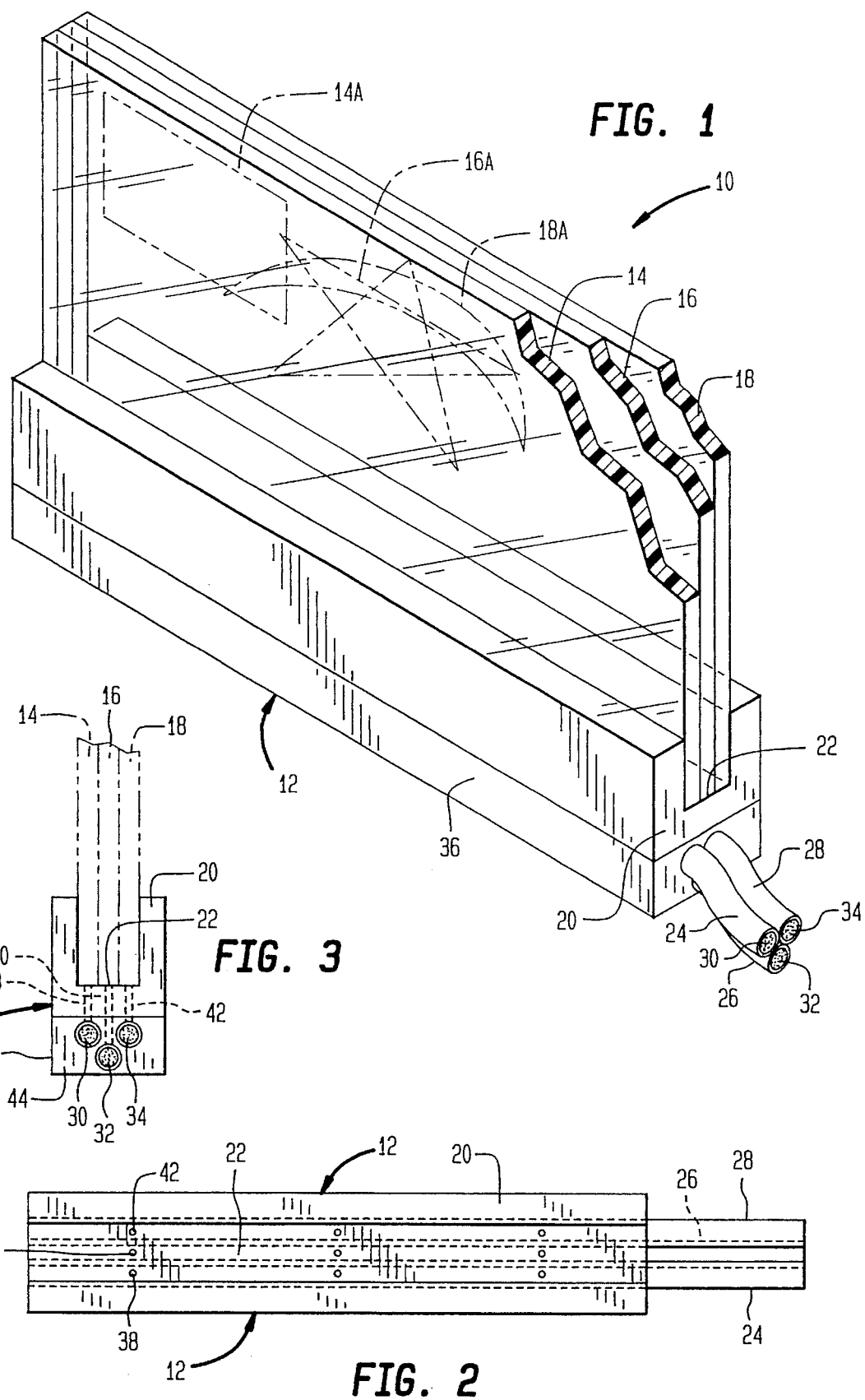

FIBER OPTIC LIGHT BAR FOR EDGE LIGHTED SIGNAGE

BACKGROUND OF THE INVENTION

This invention relates generally to illuminated display signage, and more particularly to a fiber optic illuminating device providing multiple beams of light for edge lighting a plurality of side-by-side transparent sign panels.

The utilization of fiber optic bundles in the transmission of light in conjunction with items of display is well-known. U.S. Pat. No. 3,638,008 to Keller discloses a mounting structure connected to a light bulb reflector in which multiple fiber optic bundles are mounted.

Treace in U.S. Pat. No. 3,790,249 teaches a fiber optic illuminating device for operating a microscope. A plurality of point light sources provided by fiber optic bundles having one end thereof adjacent to a light source and the other ends of the individual fiber bundle strands cut at various lengths to provide the decorative point light sources is disclosed in U.S. Pat. No. 4,613,926 to Heitman.

In U.S. Pat. No. 4,729,070, Chiu has invented an adjustable ring light having circumferentially spaced beams of light emitted from the ends of optical fiber bundles which have a movable point of convergence.

In my previous U.S. Pat. No. 5,000,535, in have invented a fiber optic light bar which, by fiber optic means, provides multiple beams of light from a single light source, the points of light being emitted along the length of the light bar. These light beam sources along the light bar are fixed in angular orientation and aligned in a row for illuminating, for example, jewelry with a display case.

Three other U.S. Pat. Nos. 4,417,412 and 4,738,510 to Sansom and U.S. Pat. No. 4,860,475 to Levy all disclose display devices utilizing optical fibers illuminated from a single light source. However, none of these inventions are structurally similar to that of the present invention.

The present invention provides a unique fiber optic light bar for the edge illumination of a plurality of transparent display panels held in side-by-side relation, each of the display panels carrying viewable indicia painted, etched or engraved thereon. By the preselected sequential illumination of one or more of the display panels, various distinctive visual effects are achieved.

BRIEF SUMMARY OF THE INVENTION

This invention is directed to a fiber optic display sign for preselected sequential lighting of one or more of a plurality of transparent side-by-side panels each having viewable indicia thereon. Selective illumination of each of the panels is by a single light source which transmits light through a selective light transmitting device into fiber optic bundles which terminate at the opposite ends at and are secured in one or more openings defining a plurality of rows in an elongated light bar. The panels, when secured to the light bar having one edge of each panel in optical alignment with one of the rows of optical fiber bundle ends, may be sequentially illuminated to create distinctive visual effects as in advertising and display.

It is therefore an object of this invention to provide a fiber optic light bar for the edge illumination of display signage comprising a plurality of aligned, side-by-side transparent panels each carrying viewable indicia thereon.

It is another object of this invention to provide a fiber optic light bar for the edge illumination of signage which includes a sequencing device for the selective sequential transmission of light through the fiber optic bundles from a single light source.

It is yet another object of this invention to provide a fiber optic sign having the appearance of a single display panel while affording sequenced multi-image illumination of the various components of indicia which make up an entire display message.

In accordance with these and other objects which will become apparent hereinafter, the instant invention will now be described with reference to the accompanying drawings.

BRIEF DESCRIPTION OF THE DRAWINGS

FIG. 1 is a perspective view of the fiber optic light bar and multi-panel signage of the present invention.

FIG. 2 is a top plan view of FIG. 1 absent the transparent display panels.

FIG. 3 is an end elevation view of FIG. 1 showing the display panels in phantom.

DETAILED DESCRIPTION OF THE INVENTION

Figure 4:
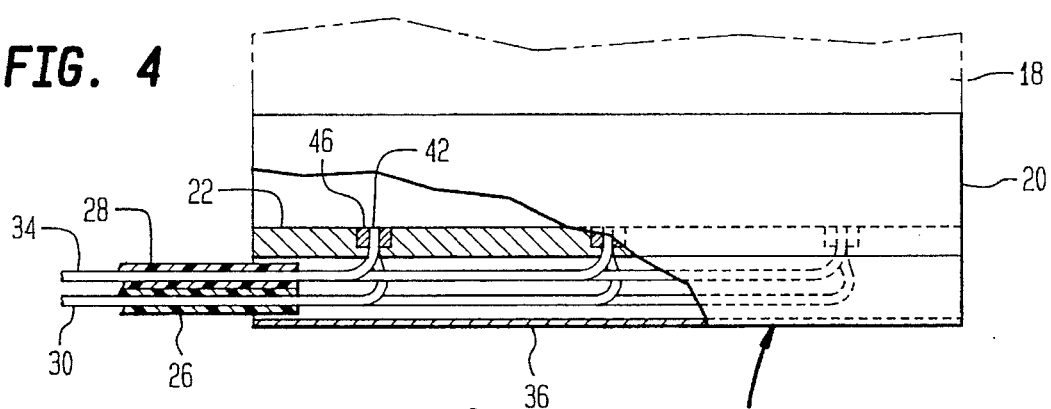
FIG. 4 is a partially broken side elevation view of FIG. 1 showing the display panels in phantom.

Referring now to the drawings, and particularly to FIGS. 1 to 4, the invention is shown generally at numeral 10 and includes a fiber optic light bar 12 which supportively engages around a plurality of transparent plastic display panels 14, 16 and 18. The transparent panels are supported in side-by-side aligned relationship against one another within an elongated U-shaped channel 20 forming an upper portion of the light bar Each of the transparent display panels 14, 16 and 18 includes viewable indicia 14a, 16a and 18a painted, etched, engraved or the like thereon. These viewable indicia 14a, 16a and 18a may be in the form of a corporate logo, a particular advertising message, multi-layered pictorial graphics or the like. When viewed in an unlighted mode, the entire combination of these indicia 14a, 16a and 18a is viewed from the side such as a unitary display indicia.

A base member 36 is connected immediately beneath the U-shaped channel 20 and houses a plurality of optic fiber bundles 30, 32 and 34 which extend therealong. These optic fiber bundles 30, 32, and 34 are preferably sheathed with a neoprene protective coating 24, 26 and 28, and may also be bedded in epoxy 44. Each of these optical fiber bundles 30, 32 and 34 have portions of the optic fibers therewithin branching therefrom upwardly through the openings formed into the bottom 22 of channel 20 at 38, 40 and 42. These optical fiber ends 38, 40, and 42 are typically encapsulated and sealed within an optical epoxy collar 46 (typ.) and are then ground and polished to an optical finish, typically bedded or potted within collars 46 as best seen in FIG. 4, which are then mounted in suitable openings formed into bottom 22.

The optical fiber ends 38, 40 and 42 of each of the optical fiber bundles 30, 32 and 34 each lie within and define distinctive row as best seen in FIGS. 2 and 3. These rows of optical fiber ends, typically 38, 40 and 42, are spaced laterally one to another so as to align with an optically polished edge of each of the separate display panels 14, 16 and 18. Thus, when all of the optical fiber bundles 30, 32, and 34 are illuminated by a light source, all of the transparent display panels 14, 16 and 18 are likewise illuminated. However, if only one or two of the optical fiber bundles 30, 32 and/or 34 are illuminated, the corresponding display panel(s) are likewise individually illuminated, leaving the remaining display panel unilluminated.

By this arrangement, each of the viewable indicia 14a, 16a and 18a may be illuminated and highlighted in this manner. Likewise, any combination of the display indicia 14a, 16a and/or 18a may be illuminated in combination to achieve a particular visual effect.

Figure 5:
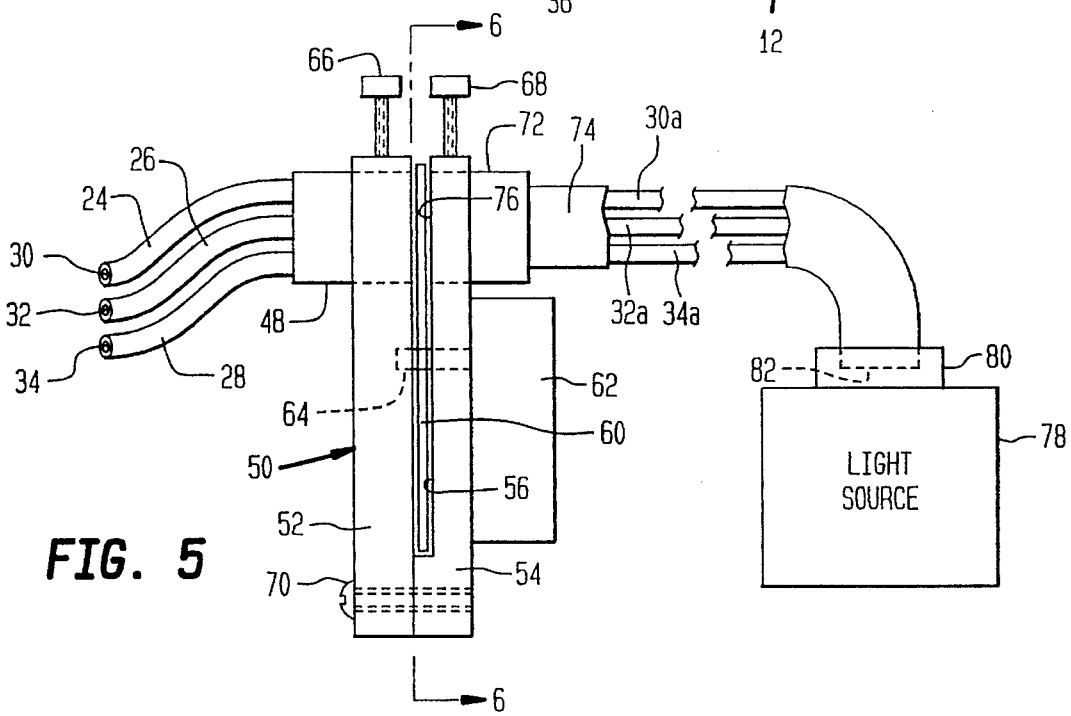
FIG. 5 is. a side elevation view of the light sequencing device positioned between a single light source and the fiber optic bundles leading to the light bar shown in FIG. 1.
Figure 6:
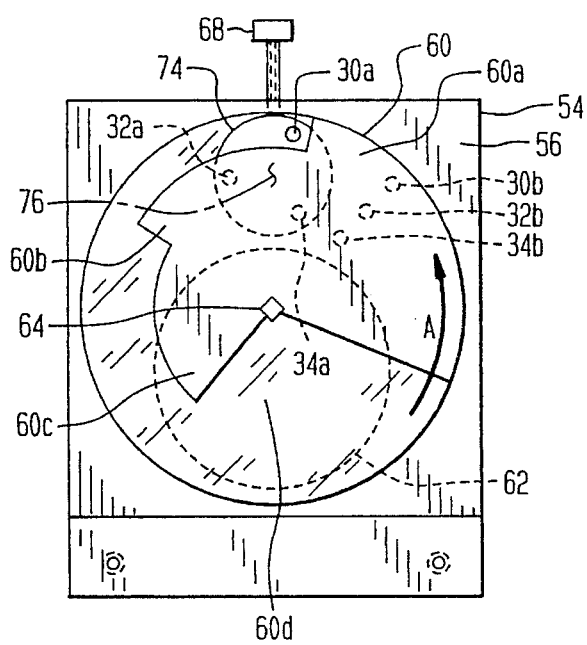
FIG. 6 is a view in the direction of arrows 6—6 in FIG. 5.

Referring now to FIGS. 5 and 6, a mechanism for accomplishing the preselected sequential illumination of the various display panels 14 16 and 18 is there shown generally at numeral 50. This light sequencing mechanism 50 includes two rigid plates 52 and 54 which are connected against one another by threaded fasteners typically at 70. Plate 52 is structured having an opening to receive end coupling 48 connected thereto, the coupling 48 having secured therein the ends of the plurality of sheathed optical fiber bundles 24, 26 and 28 which extend from the light bar 12 as previously described. A thumb screw 66 releasably retains this arrangement so as to position the sealed and optically polished ends of the optical fiber bundles 30, 32 and 34 within coupling 48 in the position shown within plate 52.

Plate 54 includes a similar opening for receiving end coupling 72, lockably engagable therewithin by thumb screw 68. This coupling 72 sealingly houses the optically polished end 76 a plurality of optical fiber bundles 30a, 32a and 34a which extend within protective conduit 74 to interconnection within collar 80 of a light source 78. The optically polished opposite end 82 of this fiber optic bundle 74 is positioned so as to all be entirely illuminated by the light source 78. Note that the optical fiber bundle ends 30a, 32a and 34a are aligned with the corresponding ends of optical fiber bundles 30, 32 and 34 in the configuration shown in FIG. 6.

Mounted for rotation between plates 52 and 54 within recess 56 is a partially transparent disc 60 which is driveably rotated on shaft 64 slowly in the direction of arrow A by motor 62. This disc 60 includes regions of opaque coating 60a, 60b and 60c. As best seen in FIG. 6, the optical fiber bundles 30a, 32a, and 34a are positioned within coupling 74 so as to be directly aligned with the corresponding fiber bundles 30, 32 and 34 within adapter 48 of plate 52, when plates 52 and 54 are connected.

The light emitting from light source 78 is thus transmitted uniformly through all fiber bundles 30a, 32a and 34a. However, as disc 60 rotates, light emitting from one or more of the optic fiber bundles 30a, 32a and 34a may be blocked by the opaque regions 60a, 60b and 60c.

By this arrangement, or any other desired arrangement of a particular opaque configuration, the light transmission between optical fiber bundles 30a/30, 32a/32 and 34a/34 may be selectively interrupted, the consequence being that previously described, i.e. selective illumination of transparent panels 14, 16 and 18.

Alternately, the fiber bundles may be individually end sealed and polished and then inserted at 30b, 32b, 34b, and in alignment with the corresponding ends of fiber bundles 30, 32 and 34.

It is noted that, although the light interruption previously described is preferably accomplished by applying an opaque coating onto a circular transparent disc 60, the identical effect may be accomplished by simply forming a thin metallic segment of a disc in the form of the entire opaque area shown in FIG. 6, absent the transparent portion thereof. Alternately, the opaque portion of transparent disc 60 may be substituted with a translucent coating to add one or more particular colors to this illumination sequencing of panels 14, 16 and 18.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A fiber optic display sign, comprising:

an elongated U-shaped channel member having a generally flat bottom lighting surface;

a plurality of spaced openings forming rows, said rows extending in parallel arrangement along at least a portion of a length of said lighting surface and spaced transversely across a width of said lighting surface;

each of said plurality of spaced openings having an optically polished end of a discrete optical fiber bundle portion fixedly secured therein;

each of said optical fiber bundle portions of each said row divided from one of a first plurality of discrete optical fiber bundles;

each of said first optical fiber bundles extending from said channel member to a common optically polished second end of each said first optical fiber bundle;

a plurality of panels received in said channel member;

said channel member also having side walls spaced apart to supportively receive said plurality of panels therebetween, each said panel having one edge positioned and held against said lighting surface in alignment with one said row;

a sequencing means positioned between said second end of said first plurality of optical fiber bundles and a first end of a second plurality of optical fiber bundles for selectively allowing the transmittal of light between said first and second pluralities of optical fiber bundles;

a light source optically connected to a second end of said second plurality of optical fiber bundles;

said sequencing means including:

a rotatable disc having an opaque or colored transparent region thereon positioned and sized to sequentially interrupt or modify light transmittal between said first and second pluralities of optical fiber bundles as said disc is rotated.

* * * * *